United States Patent [19]
Tsue

[11] Patent Number: 5,155,823
[45] Date of Patent: Oct. 13, 1992

[54] ADDRESS GENERATING UNIT

[75] Inventor: Yoshiki Tsue, Katano, Japan

[73] Assignee: Matsushita Electric Industrial Co., Ltd., Osaka, Japan

[21] Appl. No.: 339,111

[22] Filed: Apr. 17, 1989

[30] Foreign Application Priority Data

Apr. 18, 1988 [JP] Japan .................. 63-94826

[51] Int. Cl.$^5$ .................................. G06F 12/00
[52] U.S. Cl. .................. 395/400; 364/DIG. 1;
364/238.6; 364/244; 364/246; 364/246.3;
364/247; 364/251; 364/254; 364/255.1;
364/255.8
[58] Field of Search ... 364/200 MS File, 900 MS File;
395/400, 425

[56] References Cited

U.S. PATENT DOCUMENTS

| | | | |
|---|---|---|---|
| 4,084,151 | 4/1978 | Penner | 360/6 |
| 4,847,750 | 7/1989 | Daniel | 364/200 |
| 4,876,937 | 10/1989 | Suzuki | 84/612 |
| 5,017,141 | 5/1991 | Relf et al. | 434/29 |

Primary Examiner—Stuart S. Levy
Assistant Examiner—Rebecca L. Rudolph
Attorney, Agent, or Firm—Stevens, Davis, Miller & Mosher

[57] ABSTRACT

Independently from a register for storing a base address and a word counter for counting a word length, an address generating unit comprises a group of registers for storing a plurality of relative addresses, thereby successively generating regularly skipped addresses.

4 Claims, 13 Drawing Sheets

ADDRESS GENERATING UNIT

BACKGROUND OF THE INVENTION

The present invention relates to an address generating unit within a DMA controller.

The conventional address generating unit, using a base address and a word length as parameters, generates addresses through addition or subtraction between an output from a word counter and the base address.

The address generating unit having such a construction has a problem that the generated addresses are always successive and skipped addresses can not be generated.

This is not problematic in the case where data to be transferred are always mapped on a memory so that they are successively accessed in the ascending or descending order thereof. However, in inter-processor communications through complicated networks, etc., data sources (transmitter) and data destinations (receivers) are not necessarily fixed. In many cases, certain collected data are not stored in successive memory regions but the respective data are stored at certain regularly skipped addresses. In this case, if the data are accessed through the conventional manner, disadvantages such as a necessity of rewriting the value of a register storing a base address whenever one word is accessed will be encountered, thereby extremely greatly reducing the efficiency of the address generating unit.

SUMMARY OF THE INVENTION

An object of the present invention is to provide an address generating unit which can successively generate skipped addresses.

In order to attain the above object, in accordance with one aspect of the present invention, there is provided an address generating unit comprising a first counter connected with a data bus which counts a set lower limit to an upper limit value in response to each input of a clock and outputs the counted value as a first selection signal, and a group of registers connected with the data bus and comprised of a plurality of registers corresponding to input values of the first selection signal wherein the value set in each of the registers corresponding to the selection signal is repeatedly outputted as an address.

In accordance with another aspect of the present invention, there is provided an address generating unit comprising a first counter connected with a data bus which counts from a set lower limit to an upper limit value in response to input of a first control signal and outputs its carry as a second control signal, a first register connected with the data bus, an output of which is connected with a first input terminal of a first adder having two input terminals, a second register which sends an output from the first adder, to a first input terminal of a second adder and a second input terminal of the first adder in response to input of the first control signal and is reset to 0 in response to input of the second control signal, and a second counter connected with the data bus which counts from a set lower limit to an upper limit value in response to input of the second control signal, and outputs the counted value to a second input terminal of the second adder.

In accordance with the arrangement of this aspect of the present invention, if the counted value in the first counter as a first selection signal is outputted as a pointer for the group of registers, one of the group of registers is selected and the value in the selected register is outputted as an address from the group of registers. Then, the first counter repeatedly counts from the set lower limit to upper limit values while a clock signal is inputted, and the contents of the register corresponding to the first selection signal are outputted as addresses from the group of registers. Therefore, if a plurality of skipped addresses are stored in the group of registers, these skipped addresses can be successively generated.

Further, in accordance with another aspect of the present invention, the values outputted from the second register constitute an arithmetic series having a difference of the contents of the first register in response to input of the first control signal and is reset in response to input of the second control signal. The second counter serves to count the lower limit to the upper limit value in response to input of the control signal and to input the counted value to the second adder.

In this way, it is possible to successively generate skipped addresses at the output of the second adder. Accordingly, the address generating unit in accordance with the present invention permits regularly skipped addresses to be successively generated. This practical effect is very great.

DESCRIPTION OF THE PREFERRED EMBODIMENTS

Figure 1:
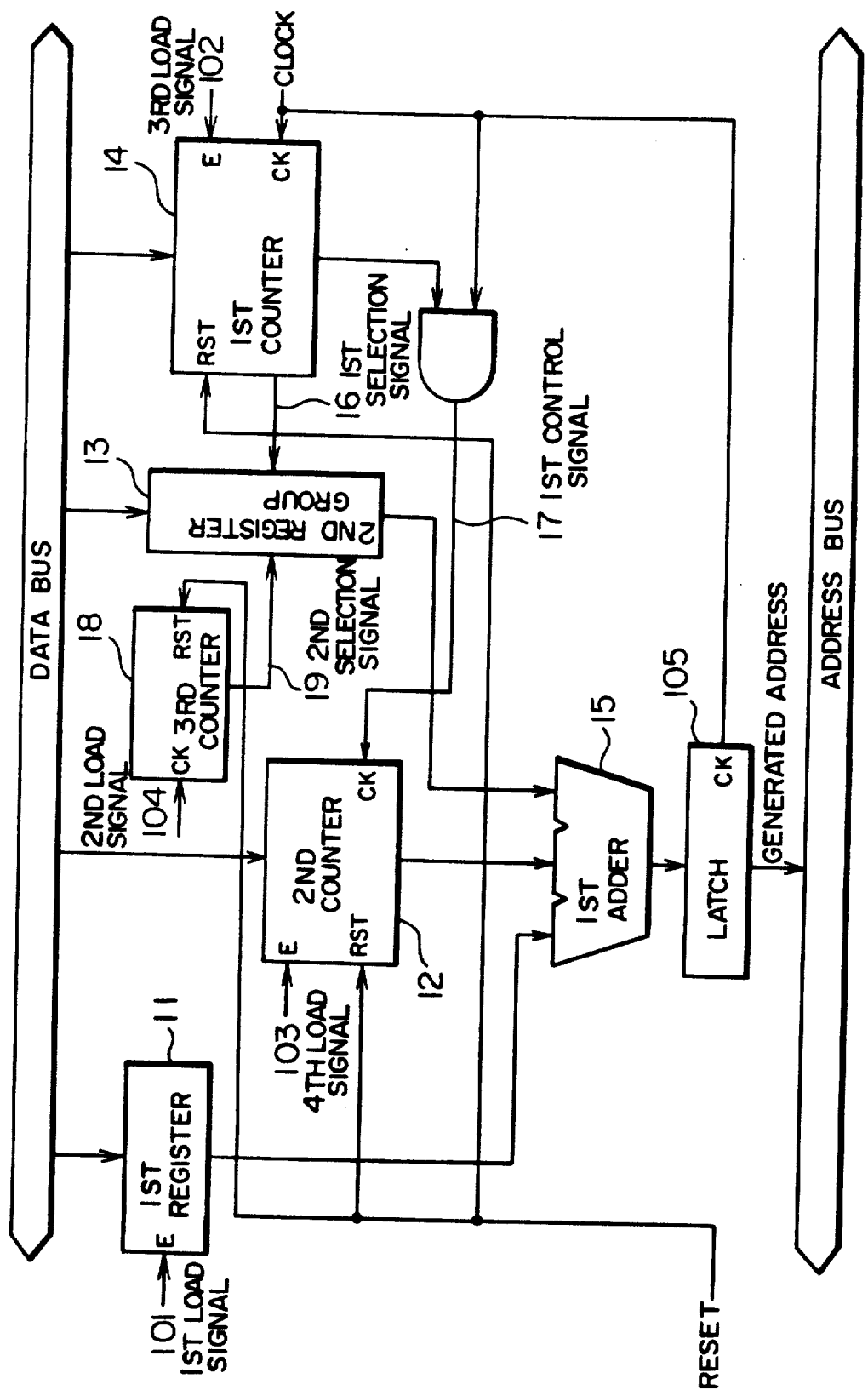
FIG. 1 is a block diagram of an address generating unit in accordance with a first embodiment of the present invention.

FIG. 1 is a block diagram showing the schematic arrangement of an address generating unit in accordance with a first embodiment of the present invention. The operation thereof will be explained with reference to FIGS. 2 to 6.

Figure 2:
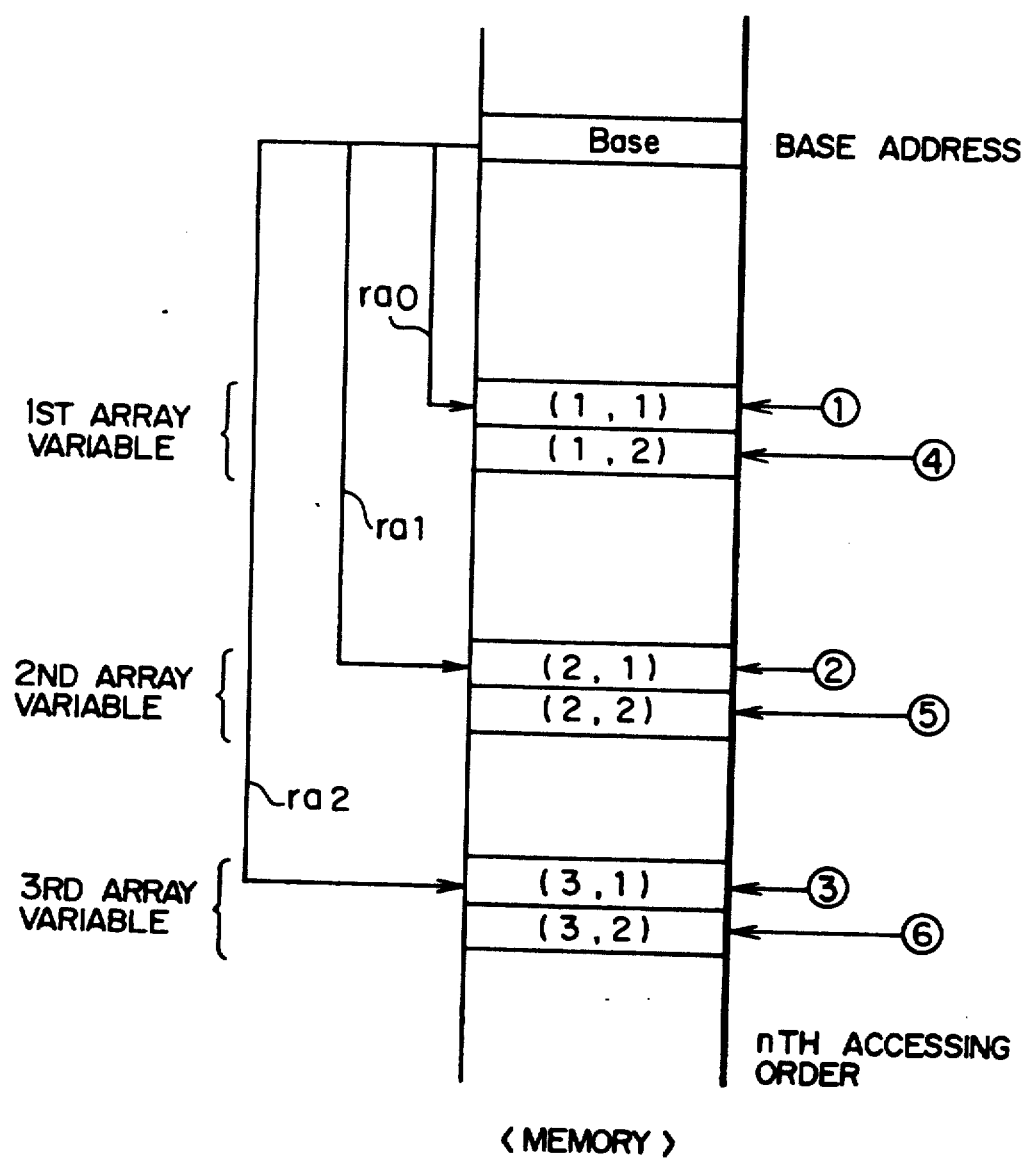
FIG. 2 is a view showing the data structure in a memory accessed by the address generating unit in accordance with the first embodiment and an accessing order thereof.

FIG. 2 shows data arrangement of a memory accessed on the basis of addresses of data blocks, generated by the address generating unit of FIG. 1. There are three kinds of array variables each consisting of two words. The base address of each array variable is represented by a relative address of ra0, ra1 and ra2 from a Base (address). It is assumed that the addresses of data blocks to be accessed are generated in the order of ①→②→③→④→⑤→⑥.

Figure 3:
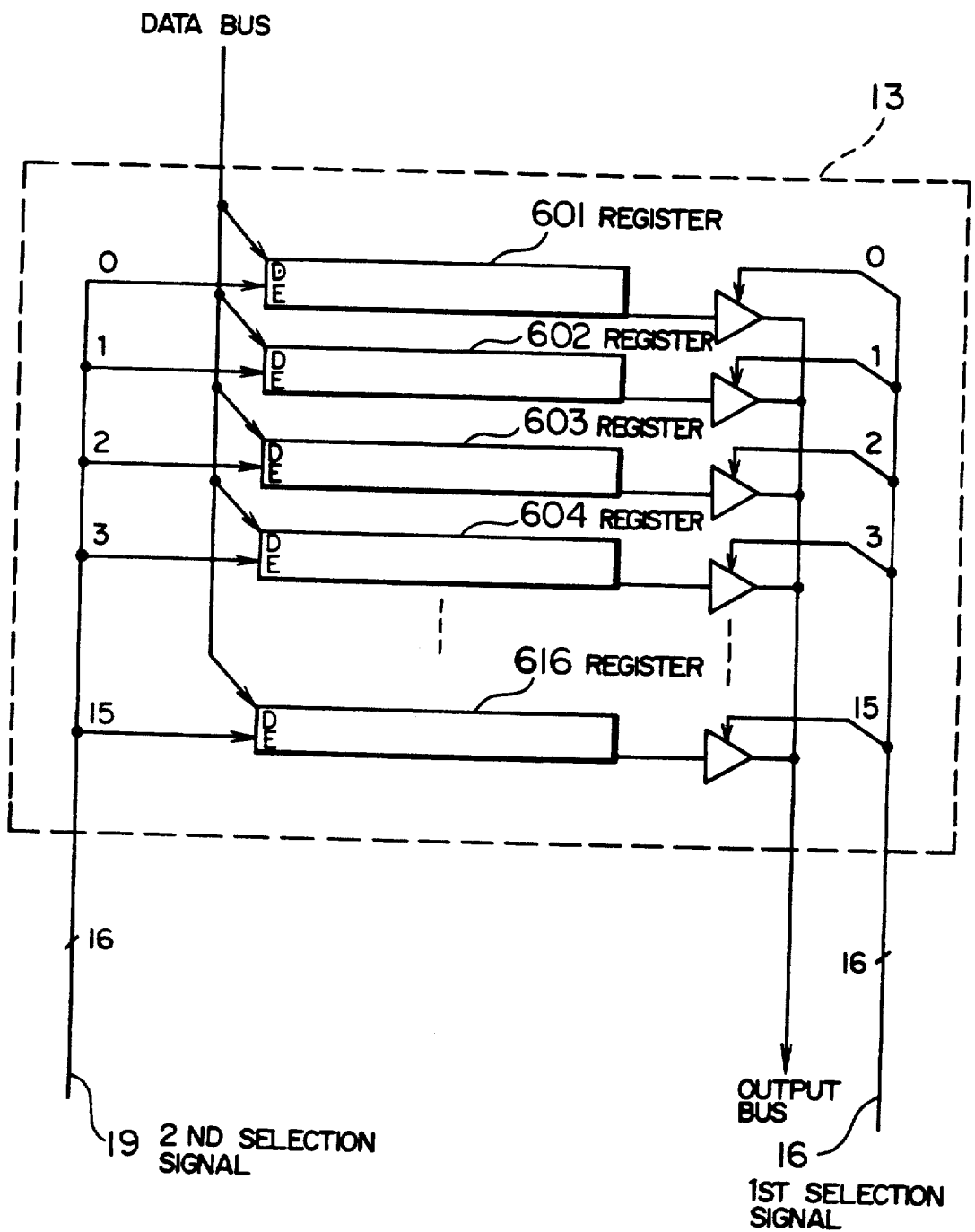
FIG. 3 is a view showing the internal arrangement of a second group of registers in FIG. 1 and of a group of registers in FIG. 10.
Figure 4:
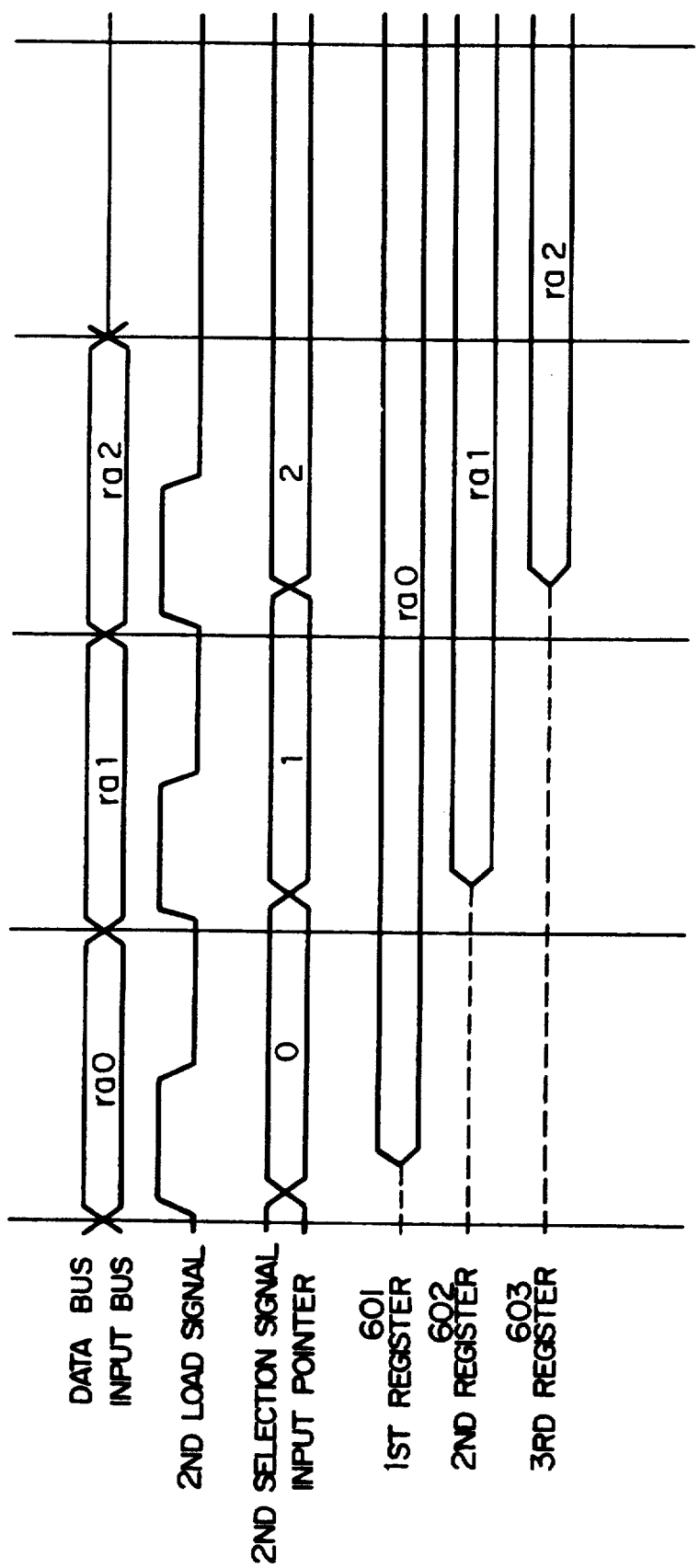
FIG. 4 is a timing chart of data storage into the second group of registers in the first embodiment of the present invention.
Figure 5:
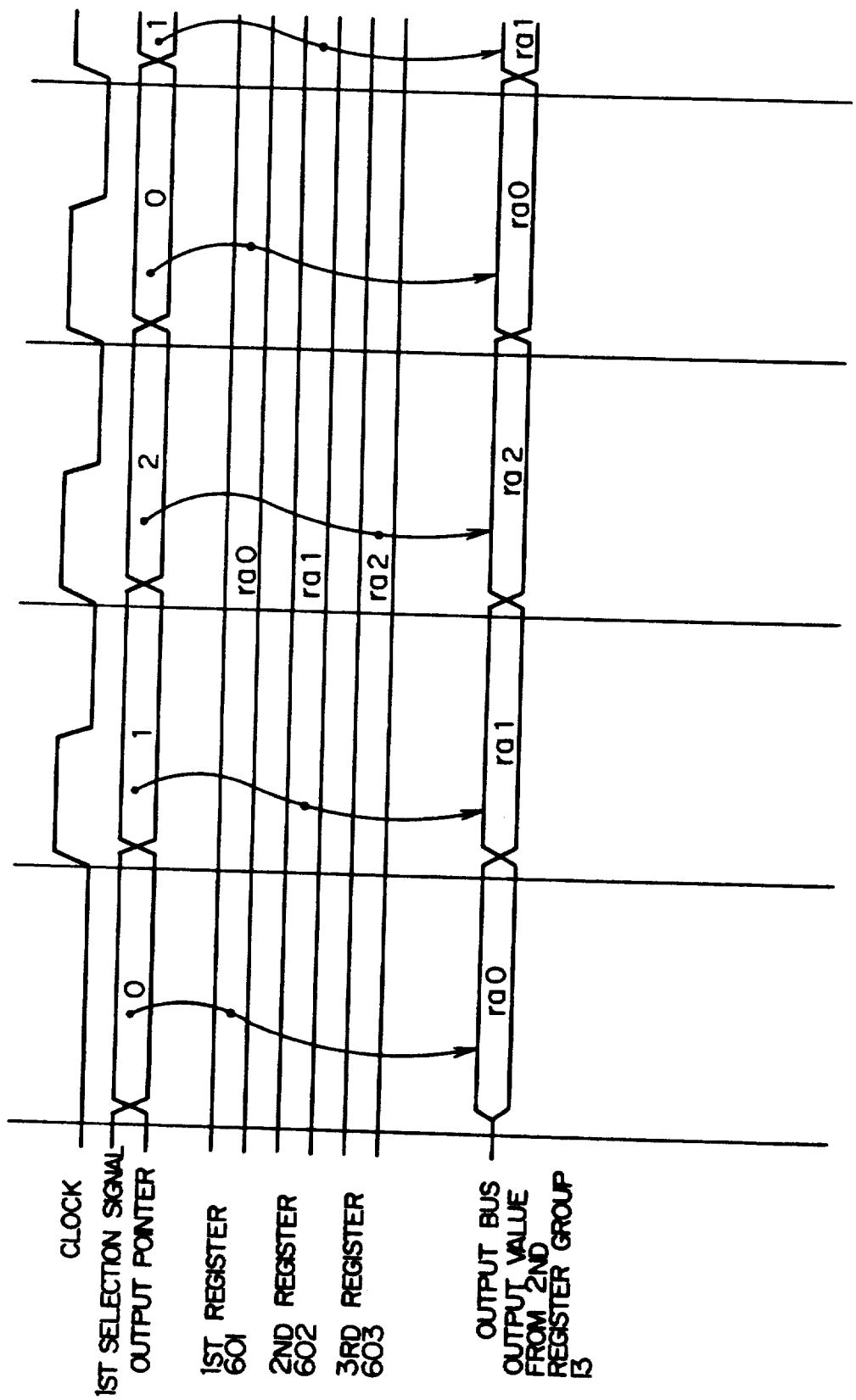
FIG. 5 is a timing chart of data read from the second group of registers in the first embodiment of the present invention.

In the address generating unit of FIG. 1, with all counters 12, 14 and 18 reset by inputting a reset signal thereto, a Base is stored in a first register 11 in response to input of a first load signal 101, {the value of the number of array variables to be used−(minus) 1} (i.e. 2 in this embodiment) is stored as an upper limit value in a first counter 14 in response to input a third load signal 102, and {the value of the number of words in one array variable−1} is stored in a second counter 12 in response to input of a fourth load signal 103. FIGS. 3, 4 and 5 show the internal structure of a second group of registers in FIG. 1, a timing chart of data storage (input), and a timing chart of data read (output), respectively. Explanation will be given for a method of storing the base address ra0, ra1 and ra2 of the respective array variables in the second group of registers 13. In FIGS. 1 and 3, when the second load signal 104 is inputted, a second selection signal (input pointer) 19 which is an outputted from the third counter 18 becomes 0 signal and then the data ra0 existing on a data bus is stored in a first register 601. Subsequently, when the second load signal 104 is inputted, the second selection signal (input pointer) 19 becomes 1 and then the data ra1 is stored in a second register 602. Further, the data ra2 is stored in a third register 603 in the same manner. Thus, initialization is made for the second group of registers 13. The timings of storage of ra0, ra1 and ra2 will be clearly understood from FIG. 4. It should be noted that, although the second group of registers include 16 (sixteen) registers, in this embodiment, only three registers 601 to 603 are used.

Thereafter, when a clock signal is inputted to a first counter 14, the first counter 14 repeatedly counts 0 to the previously set upper limit value 2. The counted values are successively sent to the second group of registers 13 as a first selection signal 16. In response to the first selection signal 16, the address data are repeatedly sent from the second group of registers 13 to a first adder 15 in the order of ra0→ra1→ra2→ra0→ra1→ra2 . . . The timings of data read from the second group of registers 13 are shown in FIG. 5. As seen from FIG. 5, prior to inputting of a clock, it will be unique that ra0 is read from the first register 601 (through an output bus in FIG. 3) in response to the first selection signal 16 (output pointer). The first counter 14 outputs a carry when it counts the upper limit 2 so that a logical product of the carry and a subsequent clock (first control signal 17) for synchronization with the subsequent clock is sent to a second counter 12 as a clock. Then, as seen from FIG. 6, the output value of the second counter 12 is converted from 0 to 1, and the value of 1 is sent to a first adder 15.

Figure 6:
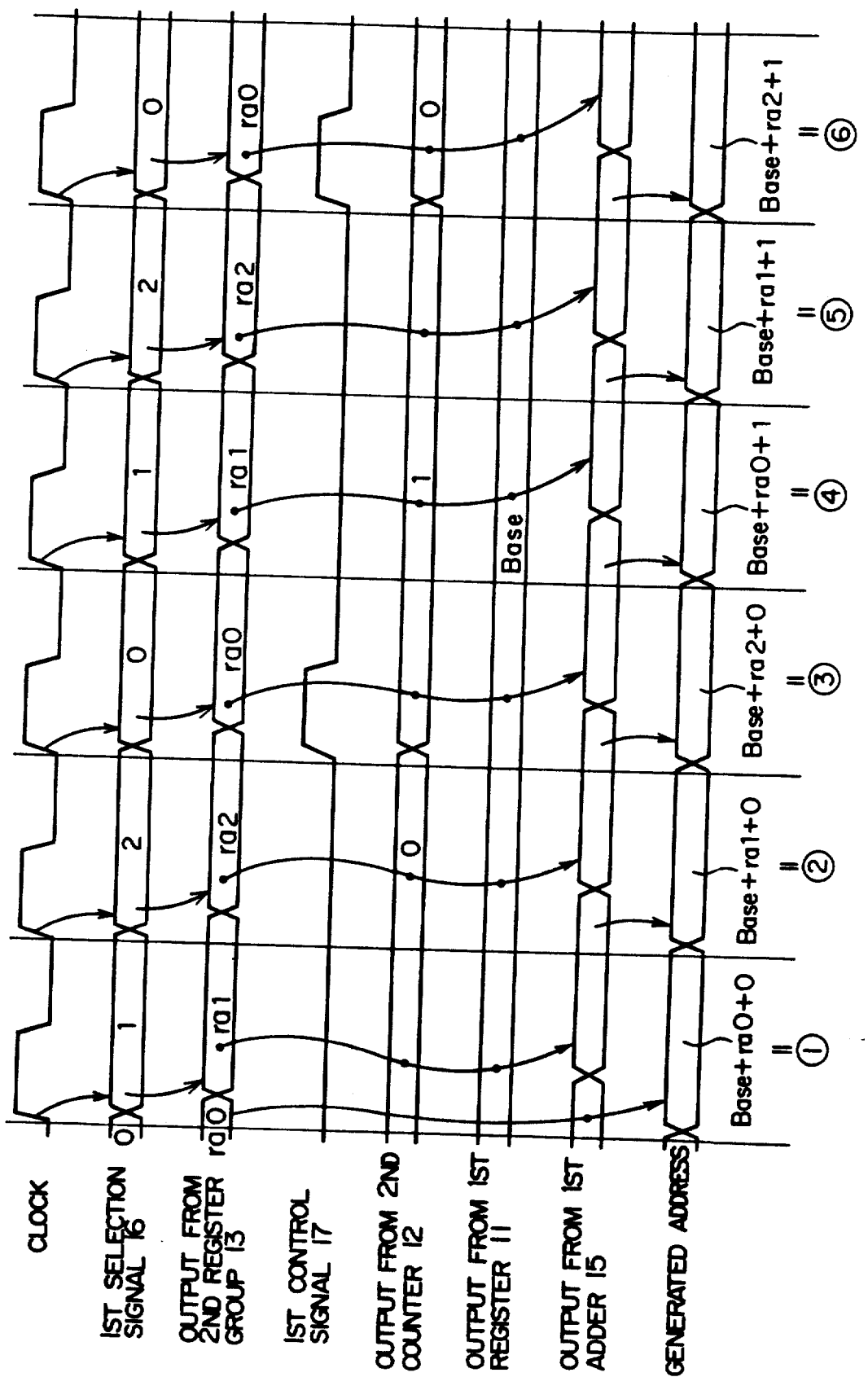
FIG. 6 is a timing chart for explaining the operation of the address generating unit in accordance with the first embodiment of the present invention.

Prior to input of a clock, a Base which is an output from the first register 11, ra0, which is an output from the second group of registers 13, and 0 signal, which is an output from the second counter 12 have been supplied to three input terminals of the first adder 15. Thus, (Base+ra0+0) is outputted from the first adder 15. A latch 105 serves to send the address output from the first adder 15 to an address bus in synchronism with a clock. In this state, when a first clock is inputted to the first counter 14, the address Base+ra0+0 is outputted to the address bus until a next clock is inputted. Thereafter, in response to each input of a clock the addresses Base+ra1+0, Base+ra2+0, Base+ra0+1, Base+ra1+1, and Base+ra2+1 are successively outputted (FIG. 6). Thus, the addresses for accessing in the order of ①→②→③→④→⑤→⑥ as shown in FIG. 2 are generated. The whole operation of the address generating unit of FIG. 1 is shown in a timing chart of FIG. 6.

As explained above, in accordance with this embodiment, by previously setting the addresses of skipped destinations, regularly skipped addresses can be successively generated. It is noted that, although above explanation has been given for the case where each of the skipped three kinds of array variables consists of the words, the same effect can be obtained for the case where each of m (m: integer) kinds of array variables consists of n (n: integer) words.

Figure 7:
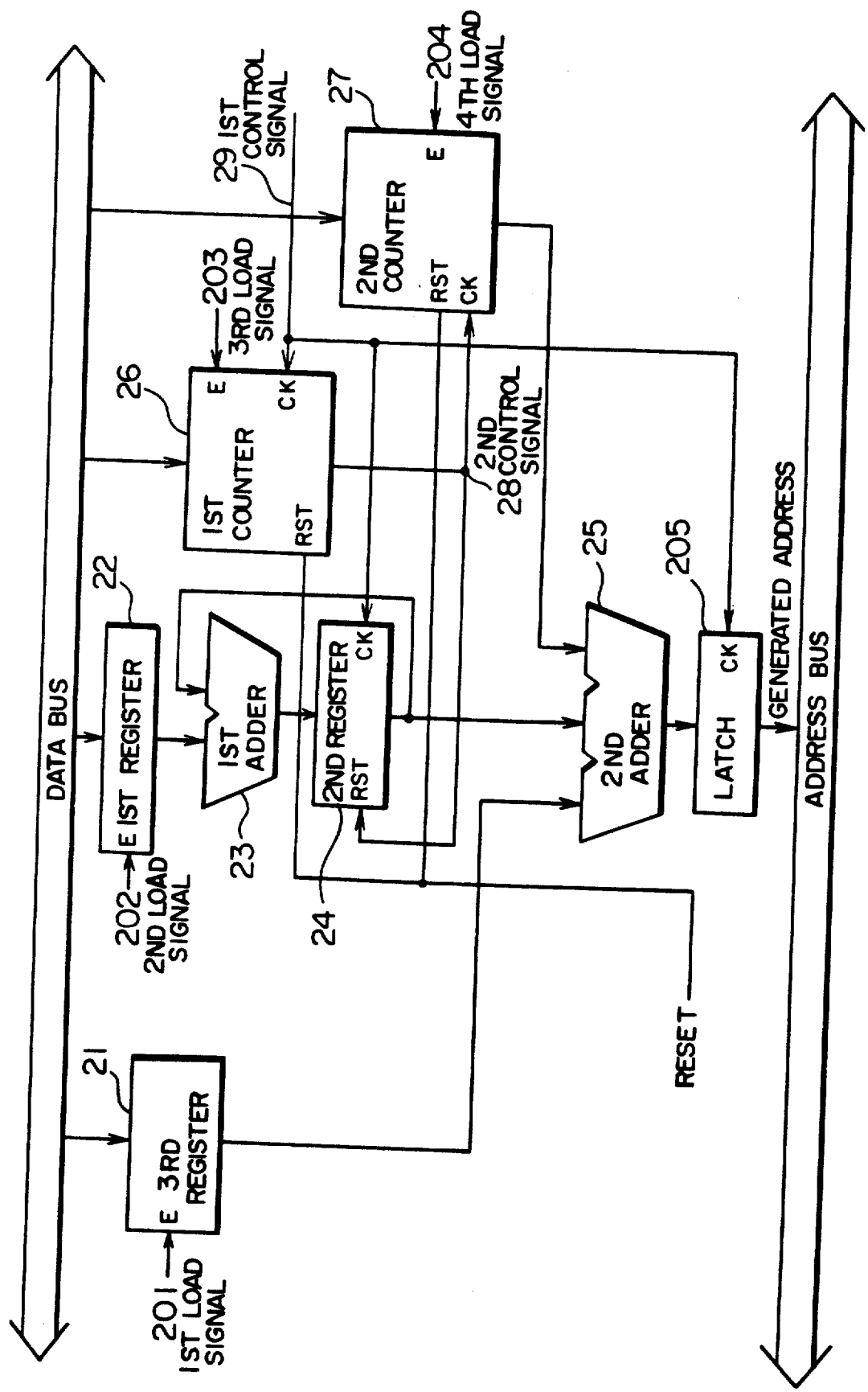
FIG. 7 is a block diagram of an address generating unit in accordance with a second embodiment of the present invention.

FIG. 7 shows a schematic arrangement of the address generating unit in accordance with a second embodiment of the present invention. An operation of the address generating unit will be explained with reference to FIGS. 8 and 9.

Figure 8:
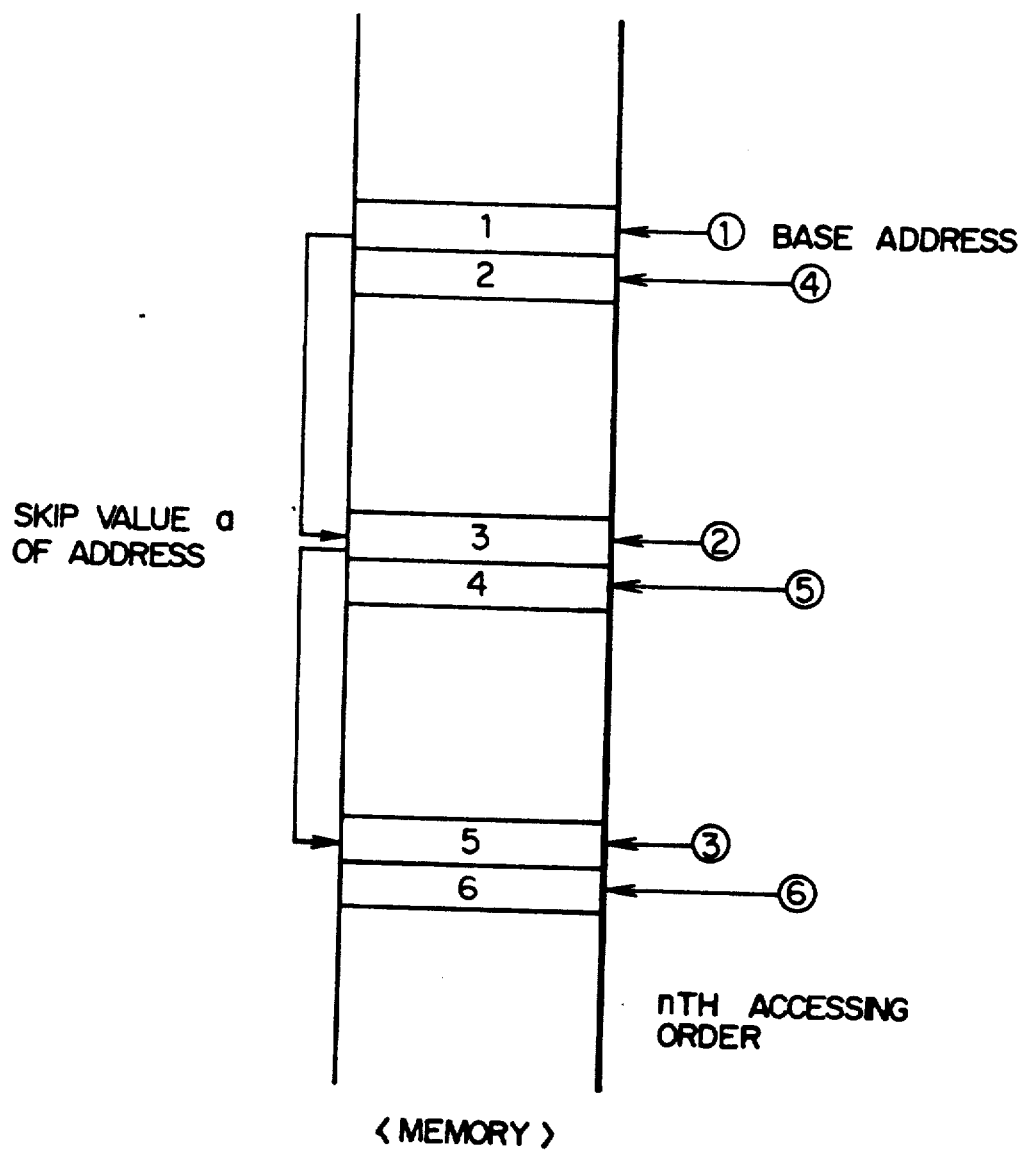
FIG. 8 is a view showing the data structure in a memory accessed by the address generating unit in accordance with the second embodiment and an accessing order thereof.

FIG. 8 shows the data arrangement in a memory to be accessed on the basis of addresses generated by the address generating unit of FIG. 7. It is assumed here that six data regularly skipped with a fixed address value are accessed in the order of ①→②→③→④→⑤→⑥, and the skip value from the base address (Base) is set to a.

In the address generating unit of FIG. 7, with all counters 26, 27 reset by inputting a reset signal thereto, a Base is stored in a third register 21 in response to input of a first load signal 201, the skip value a is stored in a first register 22 in response to input of a second load signal 202, the number 3 of addresses used for one turn accessing (① ② ③ or ④ ⑤ ⑥) is stored as an upper limit value in a first counter 26 in response to input of a third load signal 203, and {the number of turns−1} (equal to 1 in this embodiment) is stored in a second counter 27 in response to input of a fourth load signal 204.

Figure 9:
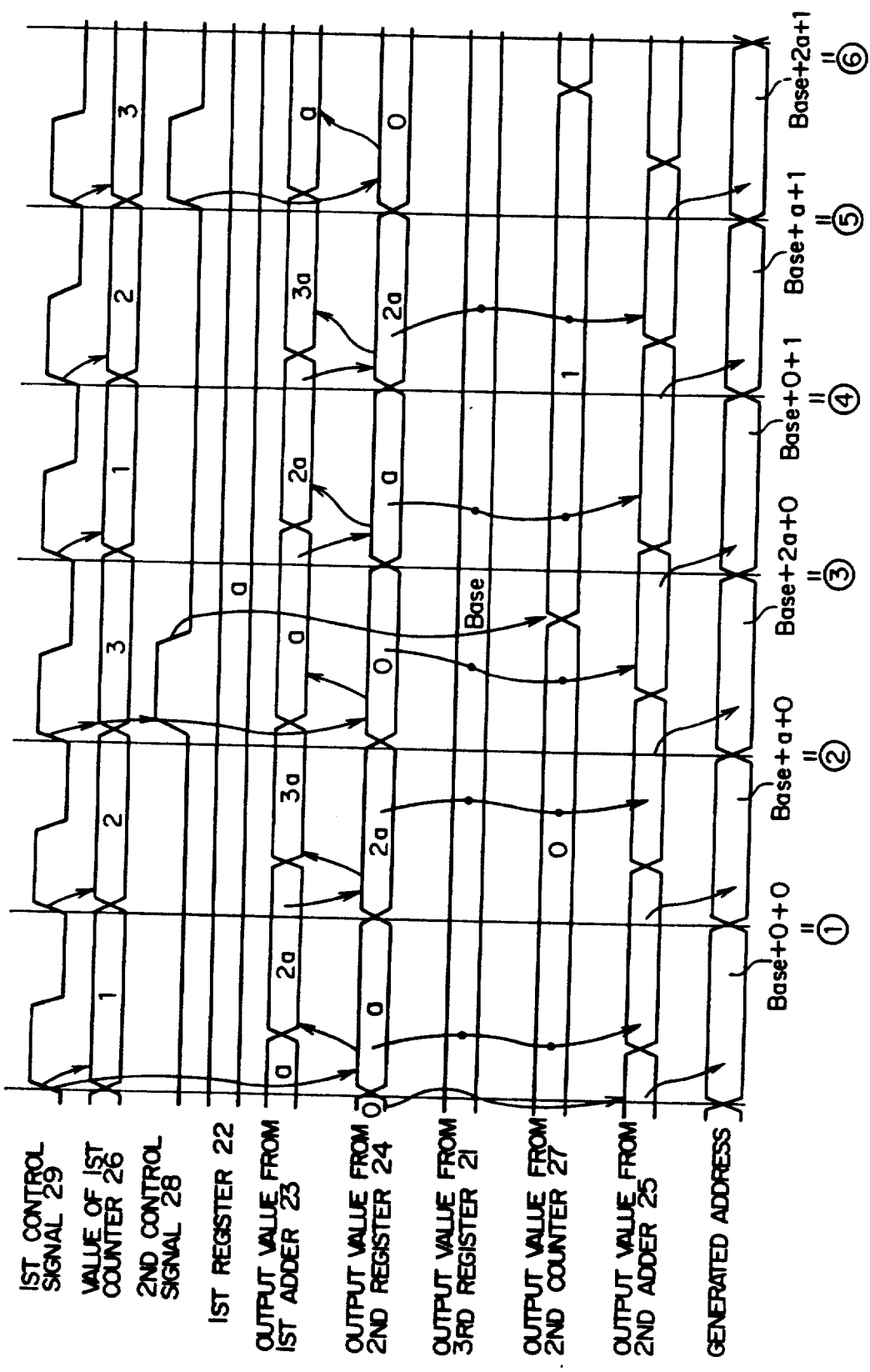
FIG. 9 is a timing chart for explaining the operation of the address generating unit in accordance with the second embodiment of the present invention.

FIG. 9 is a timing chart showing the operation of the address generating unit of FIG. 7. The operation of the address generating unit of FIG. 7 will be explained below referring to FIG. 9. Prior to input of a first control signal 29 (clock), an output value Base from the third register 21, an output value 0 from a second register 24 and an output value 0 from the second counter 27 have been supplied to input terminals of a second counter 25, and hence Base+0+0 is provided as an output value from the second adder 25. It is noted that a first adder 23 outputs an output value a from the first register 22 as it is. A latch 205 serves to supply the address output from the second adder 25 to an address bus in synchronism with the first control signal (clock) 29.

Thus, when the first control signal 29 is supplied to the first counter 26, the address Base+0+0 is generated and sent to the address bus ((1)). At the same time, the first counter 26 is updated to 1 and the second register 24 is updated to $\bar{a}$. Then, an output value $\bar{a}$ from the second register 24 is sent to the second adder 25 and also sent to the first adder 23. Therefore, Base+$\bar{a}$+0 is calculated in the second adder 25 while calculation of a $\bar{a}+\bar{a}=2\bar{a}$ is started in the first adder 23. Likewise, when a next first clock signal 29 is supplied to the first counter 26, the address Base+$\bar{a}$+0 is generated ((2)). At the same time, Base+2$\bar{a}$+0 is calculated in the second adder 25 while calculation of $\bar{a}+2\bar{a}=3\bar{a}$ is started in the first adder 23. Further, when a next first clock signal 29 is supplied to the first counter 26, the generated address Base+2$\bar{a}$+0 is outputted from the latch 205 ((3)). However, then the first counter 26 counts the previously set upper limit value "3" so that it outputs a second control signal 28. This second control signal 28 updates the second counter 27 from 0 to 1 and resets the second register 24 to 0. Thus, Base+0+1 is calculated in the second adder 25 while calculation of $\bar{a}$+0 is started in the first adder 23. Further, when a next first control signal 29 is supplied to the first counter 26, the generated address Base+0+1 is outputted ((4)). At the same time, Base+$\bar{a}$+1 is calculated in the second adder 25 while calculation of $\bar{a}+\bar{a}$ is started in the first adder 23. Thereafter, whenever the first control signal 29 is inputted, the generated addresses Base+$\bar{a}$+1 ((5)) and Base+2$\bar{a}$+1 ((6)) are successively outputted from the latch 205. In this way, the accessing order (1)→(2)→(3)→(4)→(5)→6 shown in FIG. 9 can be realized.

In accordance with this embodiment, by previously setting the skip value $\bar{a}$, skipped addresses with a fixed skip value can be successively generated. It is noted that, although in this embodiment, the skip value of address is set to $\bar{a}$, the number of addresses used for one turn accessing is set to 3 and the number of turns is set to 2, the same effect can be obtained for the number n (n: integer) of turns which may be less than the skip value $\bar{a}$ ($\bar{a}$: integer).

Figure 10:
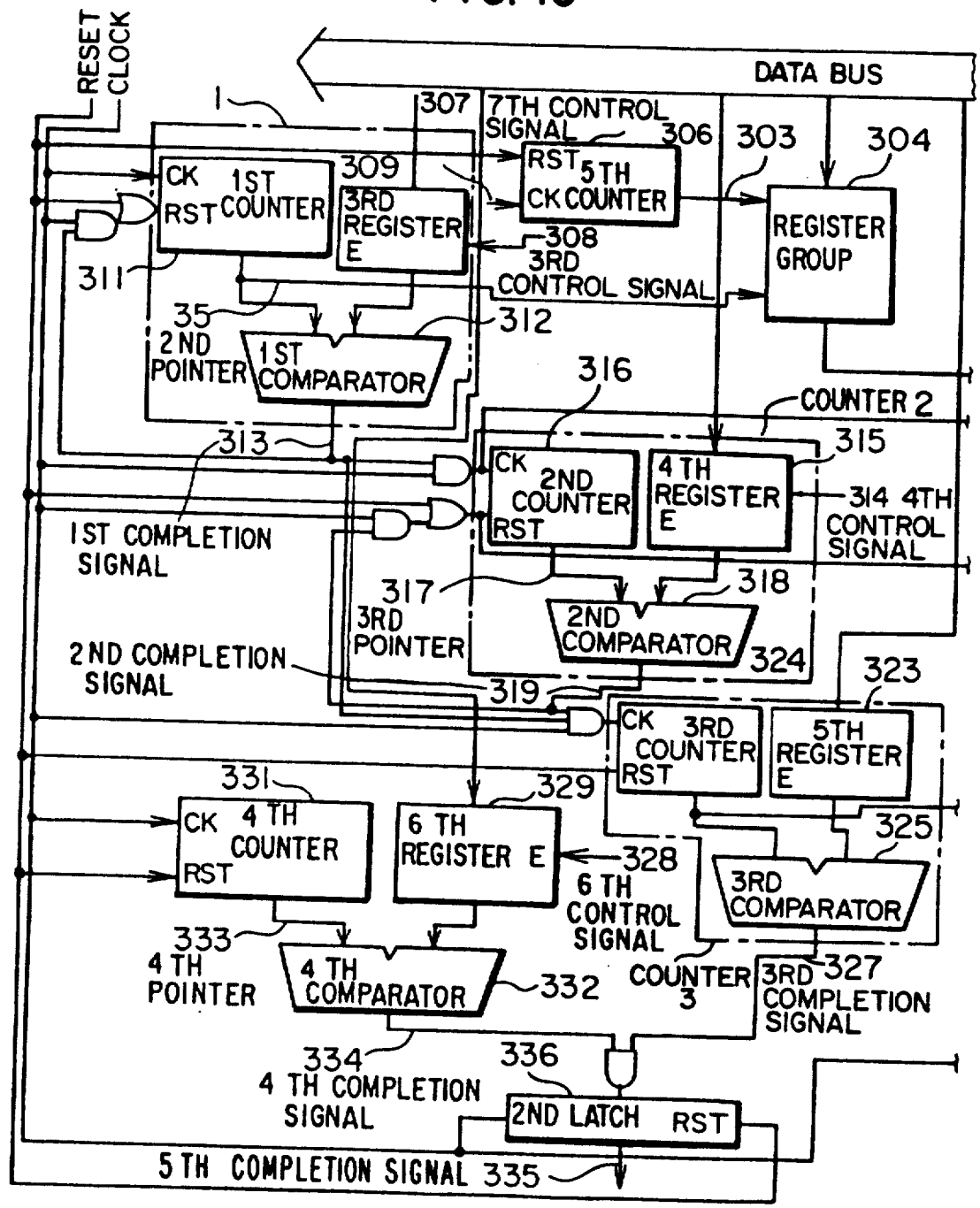
FIG. 10 is a block diagram of an address generating unit in accordance with a third embodiment of the present invention.
Figure 10:
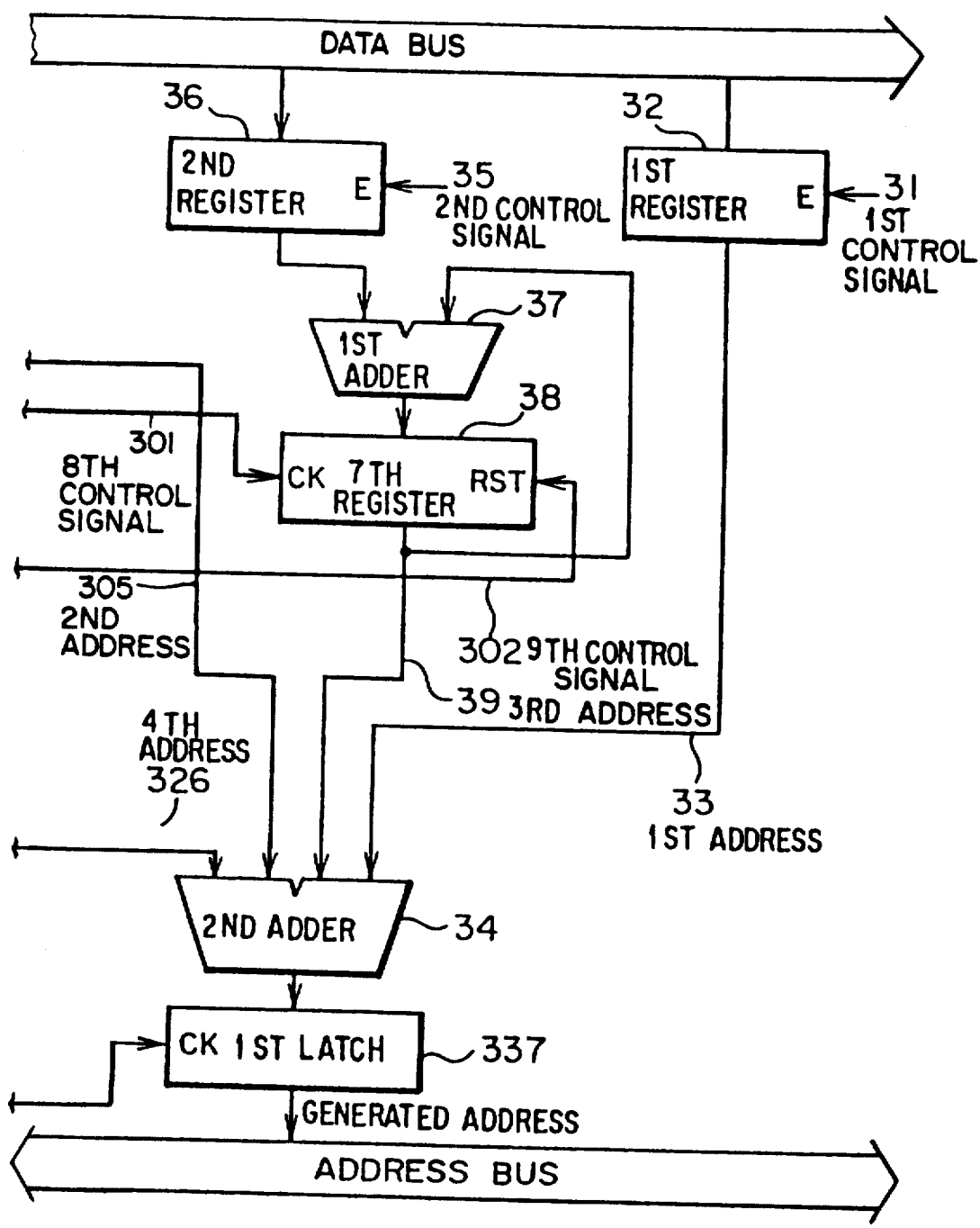

FIG. 10 shows a schematic arrangement of the address generating unit in accordance with a third embodiment of the present invention. An operation of the address generating unit will be explained with reference to FIGS. 11 and 12.

Figure 11:
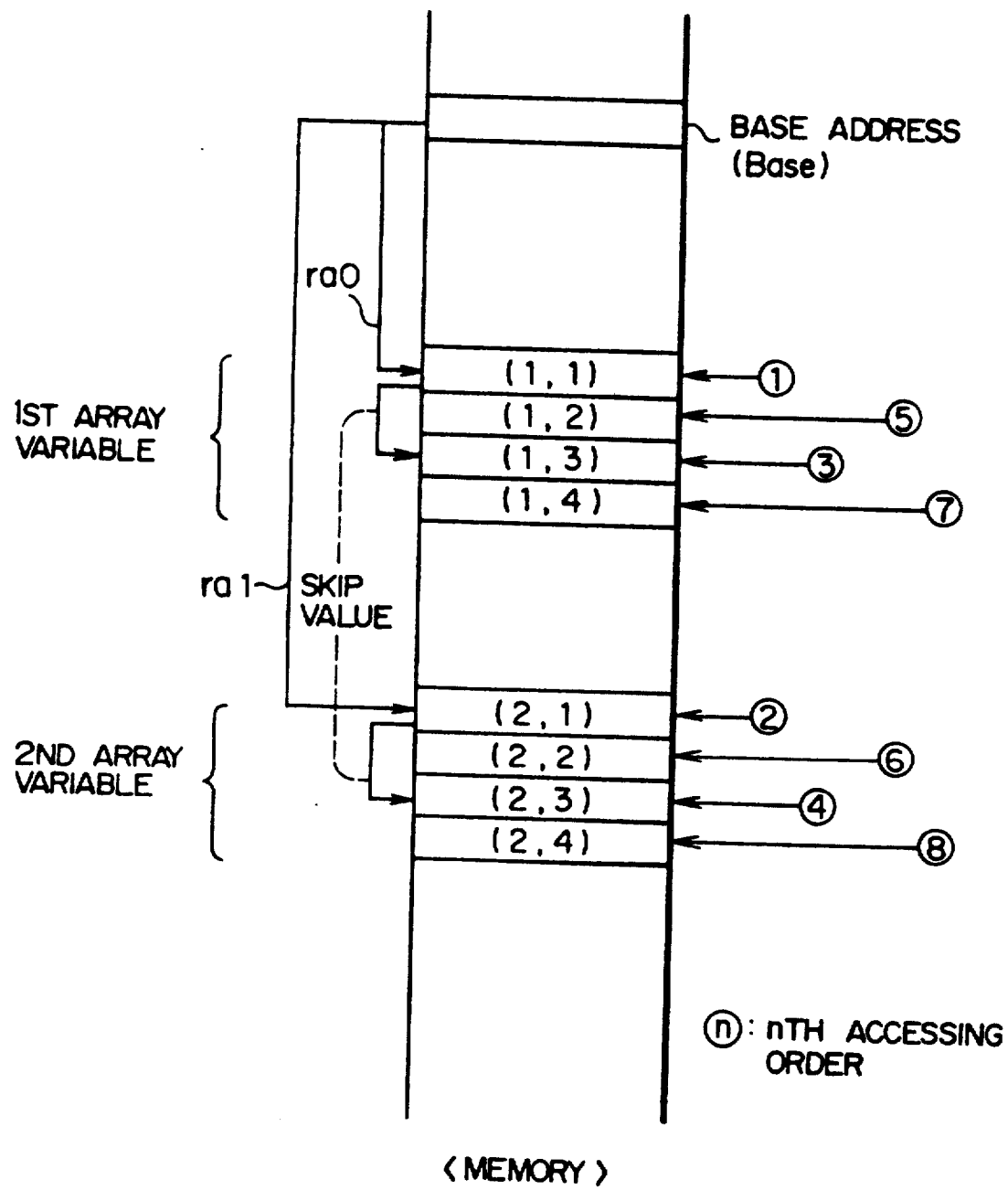
FIG. 11 is a view showing the data structure in a memory accessed by the address generating unit in accordance with the third embodiment of the present invention and an accessing order thereof.

FIG. 11 shows the data arrangement in a memory to be accessed on the basis of addresses generated by the address generating unit of FIG. 10. It is assumed here that two kinds of array variables each comprising successive four word data are arranged and the relative addresses at the base addresses of the respective array variables with respect to a base address (Base) are ra0 and ra1, respectively. Also it is assumed that the skip value in each array variable is 2 and the data are accessed in the order of (1)→(2)→(3)→(4)→(5)→(6)→(7)→(8). The address generating unit of FIG. 10 permits addresses to be generated in the form of combining the address generating units of FIGS. 1 and 7.

The address generating unit of FIG. 10 has also a combined structure of the address generating units of FIGS. 1 and 7.

In FIG. 10, a counter $\bar{1}$ is a first counter 311 which counts previously set values in response to input of a clock and outputs the counted value as a second pointer 35; a third register 309 which stores the upper limit value of count in the first counter 311 in response to input of a third control signal 308; and a first comparator circuit 312 which compares the second pointer and an output from the third register 309 and outputs a first completion signal 313 when they are equal. One of a group of registers 304 corresponding to the second pointer 336 sends its contents to a second adder 34 as a second address 305. A counter $\bar{2}$ is constituted by a second counter 316 which operates by a clock of an eighth control signal which is a signal resulting when the first completion signal 301 is in synchronism with a clock and outputs the counted value as a third pointer 317; a fourth register 315 which stores the upper limit value of count in the second counter 316 in response to input of a fourth control signal 314; and a second comparator circuit 318 which compares the third pointer 317 and an output from the fourth register 315 and outputs a second completion signal 319 when they are equal. A counter $\bar{3}$ is constituted by a third counter 324 which operates by a new clock of the result of a logical product of the second completion signal 319, the first completion signal 313 and the clock, and outputs the counted value as a fourth address; a fifth register 323 which stores the upper limit value of count in the third counter 324 in response to input of a fifth control signal 321; and a third comparator circuit 325 which compares the fourth address 326 and an output from the fifth register 323 and outputs a third completion signal 327 when they are equal. In this way, the address generating unit of FIG. 10 carries out control for generating successive address by a series of loop counters of the counter $\bar{1}$→the counter $\bar{2}$→the counter $\bar{3}$. The control operation will be explained in detail.

First, in response to input of a reset signal, all the counters 306, 311, 316, 324, 331, a seventh register 38 and a latch 2 (336) are reset. Then, in response to input of a first control signal 31, Base is stored in a first register 32; in response to a second control signal 35, the skip value 2 is stored in a second register 36; and in response to each input of a seventh control signal, ra0 and ra2 are successively stored in the group of registers 304. Further, in response to input of the third control signal 308, a value 1 which is (the number of array variables to be used−1) is stored in the third register 309; in response to input of the fourth control signal 314, a value 1 which is {(the number ((1) (3), (5) (7), (2) (4) or (6) (8)) of addresses for one turn accessing in each array variable)−1} is stored in the fourth register 315; and in response to input of the fifth control signal 315, a value 1 which is (the number of accessing turns in each array variable−1) is stored in the fifth register 323; and in response to input of a sixth control signal 328, the number 8 of words to be transferred (word length) is stored in a sixth register 329.

The first counter 311, the second counter 316 and the third counter 324 (or counter 1, counter 2 and counter 3) serves as a loop counter, and the fourth counter 331 individually counts the number of the transferred words (word length).

Figure 12:
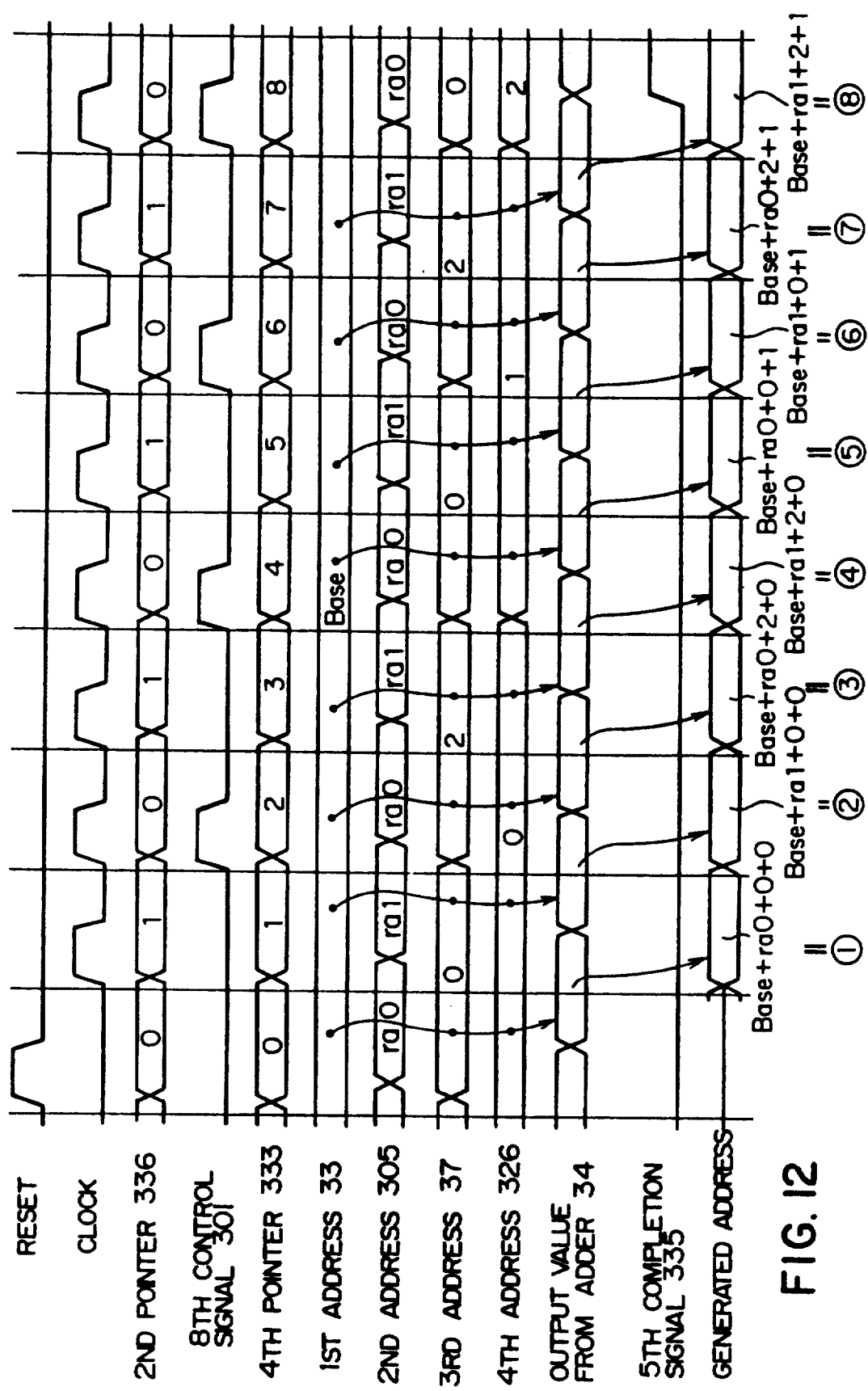
FIG. 12 is a timing chart for explaining the operation of the address generating unit in accordance with the third embodiment of the present invention.

Explanation will be given for the operation of the address generating unit with reference to a timing chart of FIG. 12 noting the operation of the above four counters.

Prior to input of a clock, the second adder 34 performs an addition of Base supplied as its first address 33, ra0 supplied as its second address 305, 0 supplied as its third address 39 and 0 supplied as its fourth address 326. Also the first address 37 performs an addition of 2 which is an output from the second register 36 and 0 which is an output from the seventh register 38. Now, when a first clock is inputted, the generated address Base+ra0+0+0 is output through a first latch 337. Then, the first counter 311 is updated so that the second pointer which represents the updated value is 1 and ra1 is outputted as the second address 305 from the corresponding register in the register group 304. Thus, the second adder 34 performs an addition of Base+ra1+0+0 while the first adder 37 still performs an addition of 2+0. Then the first comparator circuit 312 decides that both of an output value from the first counter 311 and that from the third register 309 both are 1 and equal to each other, thus producing the first completion signal 313 (①). Thereafter, when a next clock is inputted, the eighth control signal 301 is generated and also the first counter 311 is reset so that the second pointer 336 returns to 0. Thus, ra0 appears again at an output from the register group 304. Further, the seventh register 38, in response to input of the eighth control signal 301, is updated to 2 and so the third address 39 becomes 2. The second counter 316 is updated from 0 to 1. Then, the second comparator 318 decides that this output value (1) from the second counter 316 is equal to that from the fourth register 315, thus producing the second completion signal 319. Thus, the second adder 34 starts an addition of Base+ra0+2+0, while the generated address Base+ra1+0+0 calculated in response to the previous clock (②). Further, when a next clock is inputted, the generated address Base+ra0+2+0 is outputted. Then, only the first counter 311 in the loop counter is updated so that the second adder 34 calculates Base+ra1+2+0 and the first adder 37 calculates 2+2. The first comparator circuit 312 outputs the first completion signal 313 again (③). Thereafter, when a next clock is inputted, the third counter 324 is updated from 0 to 1 and at the same time, the second counter 316 and the seven register 38 are reset. And, the third comparator 325 decides that the fourth address 326 which is an output value from the third counter 324 is equal to that from the fifth register 323, thus producing the third completion signal 327. Thus, the generated address Base+ra1+2+0 is outputted. Then, the first adder 37 calculates 2+0 while the second adder 34 calculates Base+ra0+0+1 (④). Likewise, in response to each input of a clock, the generated address is successively outputted in the order of Base+ra0+0+1 (⑤)→Base+ra1+0+1 (⑥)→Base+ra0+2+1 (⑦)→Base+ra1+2+1 (⑧).

Independently from the operation of the loop counter mentioned above, in response to each input of a clock, the fourth counter 331 is updated in the order of 0→1→2→3→4→5→6→7→8. When an eighth clock is inputted, the fourth comparator 332 decides that an output value 8 from the sixth register 329 is equal to that from the fourth counter 331, thus producing a fourth completion signal. Since the third completion signal 327 has already been outputted, in response to the trailing edge of the last clock, a fifth completion signal 335 is latched by a second latch 336 and sent to the exterior.

In this way, the accessing order of ①→②→③→④→⑤→⑥→⑦→⑧ as shown in FIG. 11 can be realized.

It is noted that, although in the first embodiment, the first counter and the second counter are constructed by an adder, they may be a subtractor. Also, although in the second embodiment, the second counter is constructed by an adder, it may be a subtractor.

I claim:

1. An address generating unit connected with a data bus, comprising:
   a first counter, connected with said data bus, for counting a lower limit to an upper limit value in response to an input of a clock and for outputting the counted value as a first selection signal and for outputting, as a first completion signal, a carry value indicating that an upper limit value has been counted;
   a group of registers, connected with said data bus, said group of registers corresponding to input values of said first selection signal;
   a first adder having a first input to which a value set in said group of registers corresponding to a value of said first selection signal is repeatedly supplied as an address;
   a second counter, connected with said data bus, for counting a lower limit to an upper limit value in response to an input of said first completion signal and for outputting a carry as a second completion signal;
   a second adder;
   a first register, connected with said data bus, an output of which is connected with a first input of said second adder;
   a second register which, in response to an input thereto of said first completion signal, sends an output from said second adder to a second input of said first adder and to a second input of said second adder, and in response to an input thereto of said second completion signal, is reset to zero;
   a third counter, connected with said data bus, which counts a lower limit to an upper limit value in response to an input thereto of said second completion signal and supplies the counted value to a third input of said first adder; and
   a third register, connected with said data bus, an output of which is supplied to a fourth input of said first adder;
   whereby an output from said first adder is employed as a generated address.

2. An address generating unit connected with a data bus and an address bus, for generating an address sequence which cyclically accesses a plurality of data blocks stored in a memory, said address generating unit comprising:
   a first counter, connected with said data bus, for counting an address advance signal and outputting a counted value as a first selection signal indicating a selection of one of said data blocks, and outputting a carry signal;
   a second counter, connected with said data bus, for counting said carry signal, and outputting a counted value indicating a selection of data within a data block as a first address value;
   a third counter, connected with said data bus, for counting a load signal and outputting a counted value as a second selection signal;
   a group of registers, connected with said data bus and each register thereof storing each base address of said plurality of data blocks, for outputting a second address value in response to said first selection signal and inputting data from said data bus in response to said second selection signal which represents a counted value of said load signal; and
   an adder having a first input coupled to an output of said group of registers and a second input coupled to an output of said second counter, for outputting an added value to said address bus.

3. The address generating unit of claim 2, further comprising a first register, connected with said data bus, which outputs a third address value; and wherein said first adder further comprises a third input coupled to an output of said first register and each base address of said plurality of data blocks is indicated by a sum of said third address value and each address value provided thereto by said group of registers.

4. An address generating unit connected with a data bus and an address bus, for generating an address sequence which cyclically accesses a plurality of data blocks stored in a memory, said address generating unit comprising:

- a first counter, connected with said data bus, for counting an address advance signal and outputting a counted value as a first selection signal indicating a selection of one of said data blocks;
- a second counter, connected with said data bus, for outputting a counted value indicating a selection of data within a data block as a first address value;
- a third counter, connected with said data bus, for counting a load signal and outputting a counted value as a second selection signal;
- a group of registers, connected with said data bus, for outputting a second address value in response to said first selection signal and inputting data from said data bus in response to said second selection signal and said load signal;
- a first register, connected with said data bus, for outputting a third address value;
- a second register, connected with said data bus, for storing a value determining a modulus of said first counter;
- a comparator for performing a comparison of said first selection signal and an output of said second register and outputting a clear signal to said first counter in response to a particular result of said comparison; and
- an adder having a first input coupled to an output of said group of registers, a second input coupled to an output of said second counter and a third input coupled to an output of said first register, for outputting an added value to said address bus, whereby said second counter counts said clear signal of said comparator wherein each base address of said plurality of data blocks is indicated by a sum of said third address value and said second address value output by said grove of registers.

* * * * *